United States Patent
McAuliffe et al.

(10) Patent No.: US 9,675,929 B2
(45) Date of Patent: Jun. 13, 2017

(54) AIR SEPARATION MODULE WITH INCREASED PERMEATE AREA

(71) Applicant: Hamilton Sundstrand Corporation, Windsor Locks, CT (US)

(72) Inventors: Christopher McAuliffe, Windsor, CT (US); Haralambos Cordatos, Colchester, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 263 days.

(21) Appl. No.: 14/542,748

(22) Filed: Nov. 17, 2014

(65) Prior Publication Data

US 2016/0136570 A1    May 19, 2016

(51) Int. Cl.
| | |
|---|---|
| *B01D 53/22* | (2006.01) |
| *B01D 63/02* | (2006.01) |
| *C01B 21/04* | (2006.01) |
| *B64D 37/32* | (2006.01) |

(52) U.S. Cl.
CPC ............ *B01D 53/22* (2013.01); *B01D 63/02* (2013.01); *C01B 21/0444* (2013.01); *B01D 2053/224* (2013.01); *B01D 2313/12* (2013.01); *B01D 2319/04* (2013.01); *B64D 37/32* (2013.01); *C01B 2210/0045* (2013.01)

(58) Field of Classification Search
CPC .. B01D 53/22; B01D 63/02; B01D 2053/224; B01D 2319/04; B01D 2313/12; C01B 21/0444; C01B 2210/0045; B64D 37/32
See application file for complete search history.

(56) References Cited

U.S. PATENT DOCUMENTS

| | | | | |
|---|---|---|---|---|
| 3,526,001 A | * | 8/1970 | Smith .................. | B01D 63/024 210/321.87 |
| 3,536,611 A | * | 10/1970 | De Filippi ............. | B01D 63/02 210/321.89 |
| 3,980,605 A | * | 9/1976 | Steigelmann .......... | B01D 61/38 210/500.23 |
| 4,220,535 A | * | 9/1980 | Leonard ................. | B01D 53/22 210/321.89 |
| 4,508,548 A | | 4/1985 | Manatt | |
| 4,556,180 A | | 12/1985 | Manatt | |
| 4,640,901 A | * | 2/1987 | Lee .................... | B01D 67/0067 423/335 |

(Continued)

FOREIGN PATENT DOCUMENTS

| | | |
|---|---|---|
| EP | 0554567 A1 | 8/1993 |
| WO | WO2006079782 A2 | 8/2006 |

OTHER PUBLICATIONS

Extended European Search Report for European Application No. 15194037.6, dated Mar. 21, 2016, 9 pages.

*Primary Examiner* — Anthony Shumate
(74) *Attorney, Agent, or Firm* — Kinney & Lange, P.A.

(57) ABSTRACT

An air separation module includes a plurality of fibers located within a casing. A fiber membrane defines an exterior of each of the plurality of fibers. The fiber membrane also forms an interior passage along a length of each of the plurality of fibers. The fiber membrane is configured to permeate a gas through the fiber membrane. At least one perforated canister is placed between the plurality of fibers. The at least one perforated canister is configured to collect a permeated gas from the plurality of fibers.

13 Claims, 6 Drawing Sheets

(56) References Cited

U.S. PATENT DOCUMENTS

| | | | |
|---|---|---|---|
| 5,783,083 A * | 7/1998 | Henshaw | B01D 61/18 210/257.2 |
| 6,022,478 A * | 2/2000 | Baurmeister | B01D 15/00 210/321.6 |
| 6,370,887 B1 * | 4/2002 | Hachimaki | B01D 53/261 62/272 |
| 9,340,297 B2 * | 5/2016 | Cao | B01D 53/22 |
| 2002/0108906 A1 * | 8/2002 | Husain | B01D 61/02 210/636 |
| 2002/0195390 A1 * | 12/2002 | Zha | B01D 61/18 210/636 |
| 2003/0038075 A1 * | 2/2003 | Akimoto | B01D 63/021 210/321.79 |
| 2003/0141248 A1 * | 7/2003 | Mahendran | B01D 61/18 210/636 |
| 2004/0045893 A1 * | 3/2004 | Watanabe | B01D 63/022 210/321.79 |
| 2004/0076874 A1 * | 4/2004 | Nickel | B01D 61/362 429/104 |
| 2005/0229968 A1 | 10/2005 | Jones et al. | |
| 2006/0174762 A1 | 8/2006 | Kaschemekat et al. | |
| 2006/0248800 A1 * | 11/2006 | Miglin | B01B 1/005 48/198.7 |
| 2006/0254972 A1 * | 11/2006 | Tai | B01D 61/14 210/321.6 |
| 2007/0180989 A1 * | 8/2007 | Tanihara | B01D 53/22 95/54 |
| 2007/0205146 A1 * | 9/2007 | Schafer | B01D 61/18 210/321.69 |
| 2008/0011157 A1 | 1/2008 | Wynn et al. | |
| 2008/0087168 A1 * | 4/2008 | Wright | B01D 53/22 96/134 |
| 2009/0020008 A1 | 1/2009 | Wynn | |
| 2010/0072124 A1 * | 3/2010 | Morikawa | B01D 63/02 210/321.79 |
| 2010/0089239 A1 * | 4/2010 | Wright | B01D 53/22 96/6 |
| 2010/0224066 A1 * | 9/2010 | Ophir | B01D 61/362 96/10 |
| 2010/0326278 A1 * | 12/2010 | Nakamura | B01D 53/22 96/8 |
| 2012/0067211 A1 * | 3/2012 | Tessier | B01D 53/228 95/55 |
| 2013/0037467 A1 * | 2/2013 | Biltoft | B01D 63/02 210/151 |
| 2014/0083511 A1 | 3/2014 | Eowsakul et al. | |
| 2014/0165836 A1 | 6/2014 | Eowsakul | |
| 2014/0230649 A1 * | 8/2014 | Cao | B01D 53/22 95/47 |
| 2015/0182917 A1 * | 7/2015 | Hosoya | B01D 63/106 422/617 |
| 2016/0008768 A1 * | 1/2016 | Yoneyama | B01D 69/12 427/245 |
| 2016/0051937 A1 * | 2/2016 | Hagawa | B01D 65/02 210/636 |
| 2016/0052804 A1 * | 2/2016 | Nosaka | C02F 1/003 210/650 |

\* cited by examiner

AIR SEPARATION MODULE WITH INCREASED PERMEATE AREA

BACKGROUND

The present invention relates to air separation modules, and in particular, to air separation modules for use in aircraft applications.

On-board air separation modules can be used to create an inert environment in various locations on an aircraft, such as in the cargo area or fuel tanks. Air separation modules can produce nitrogen-enriched air using molecular sieve technology or hollow fiber membrane technology. For example, an air separation module may contain a plurality of hollow fibers that separate compressed air into a nitrogen-enriched portion and an oxygen-enriched portion. The compressed air source can be compressed RAM air or can be bleed air taken from the compressor section of the aircraft engine. In one type of air separation membrane, compressed air is fed into one end of the bore side of the hollow fibers and as the gas travels the length of the fiber, oxygen permeates through the fiber wall at greater amounts than nitrogen, is collected, and is dumped into an ambient environment. The gas exiting the hollow fibers therefore becomes oxygen-depleted or nitrogen enriched.

The nitrogen-enriched air produced by the air separation module can be directed to the fuel tanks of the aircraft. Nitrogen-enriched air is supplied to the fuel tanks in a sufficient quantity to maintain the oxygen concentration in the fuel tank below a specified amount in order to limit the flammability of the fuel tanks.

SUMMARY

An air separation module includes a plurality of fibers located within a casing. A fiber membrane defines an exterior of each of the plurality of fibers. The fiber membrane forms an interior passage along a length of each of the plurality of fibers. The fiber membrane is configured to permeate a gas through the fiber membrane. At least one perforated canister is placed between the plurality of fibers. The at least one perforated canister is configured to collect a permeated gas from the plurality of fibers.

A method for removing oxygen from engine bleed air includes feeding fluid into an air separation module. The air separation module includes a plurality of fibers located within a casing. A fiber membrane defines an exterior of each of the plurality of fibers. At least one perforated canister is inserted between the plurality of fibers. The fluid is forced down the length of the plurality of fibers. A first portion of the fluid is permeated through the fiber membrane to create a permeated fluid. A portion of the permeated fluid is collected into the at least one perforated canister. The permeated fluid is expelled from the casing. Any of the non-permeated fluid is removed from the casing through an outlet located on an end of the casing.

DETAILED DESCRIPTION

Various aircraft use systems to inert fuel tanks to reduce the oxygen concentration in the fuel tanks below a level that would support combustion. Typically, bleed air from the aircraft engine is forced into one or more air separation modules which employ partial pressure differentials across fiber membranes to push an oxygen component of the bleed air through the fiber membranes resulting in a nitrogen enriched air stream. This nitrogen enriched air is then fed into the fuel tank of the aircraft to reduce the risk of flammability and explosion.

Figure 1:
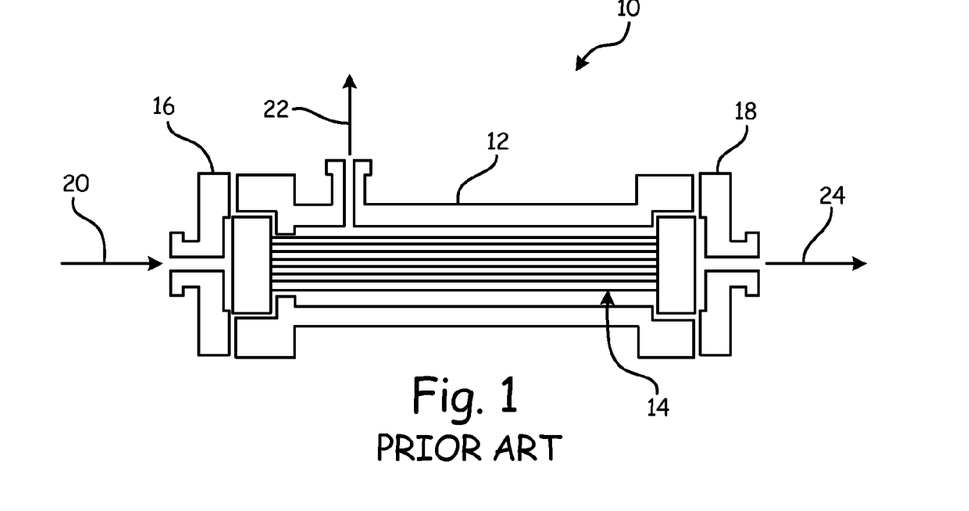
FIG. 1 is a cross-sectional view of a prior art air separation module.

FIG. 1 is a cross-sectional view of prior art air separation module 10. Prior art air separation module 10 includes cylinder 12, fibers 14, first end cap 16, and second end cap 18. Fibers 14 are enclosed inside of cylinder 12. First end cap 16 and second end cap 18 enclose the ends of cylinder 12, with first end cap 16 located at an upstream end of cylinder 12 and second end cap 18 located at a downstream end of cylinder 12. Cylinder 12 encapsulates fibers 14 by creating an air tight seal between both ends of fibers 14 and cylinder 12. First end cap 16 is in fluid communication with an upstream end of the bore side of fibers 14, and second end cap 18 is in fluid communication with a downstream end of the bore side of fibers 14.

During operation of prior art air separation module 10, feed gas 20 enters cylinder 12 through first end cap 16 and is fed into fibers 14. Feed gas 20 can be compressed RAM air or can be bleed air taken from the compressor section of the aircraft engine. As feed gas 20 travels the length of fibers 14, permeate gas 22 permeates through the walls of fibers 14. After permeate gas 22 is drawn from feed gas 20, permeate gas 22 is dumped into ambient air. The resulting reject gas 24 that travels to a downstream end of fibers 14 is then drawn out of cylinder 12 through second end cap 18.

In one example of prior art air separation module 10, fibers 14 are configured such that permeate gas 22 consists primarily of oxygen, and the resulting reject gas 24 is oxygen-depleted and/or nitrogen enriched. As mentioned above, after existing prior art air separation module 10, this nitrogen-enriched reject gas 24 can then be fed into the fuel tank of the aircraft to reduce the risk of flammability and explosion.

Cylinder 12 of prior art air separation module 10 is typically a solid cylinder with a single port from which permeate gas 22 is removed. The efficiency of the nitrogen enriched air process of prior art air separation module 10 is proportional to the oxygen partial pressure difference between feed gas 20 and permeate gas 22. Therefore, for a given feed pressure dictated by the bleed air available from the aircraft engine, mass-transfer limitations in the path of permeate gas 22 from fibers 14 to the single collection port of cylinder 12 result in a decrease in said oxygen partial pressure difference which, in turn, results in decreased efficiency. An inefficient air separation module will add weight and cost to the aircraft. Feed gas 20 is compressed or ambient air equivalent composition having a mixture of oxygen and nitrogen among other gases.

Figure 2:
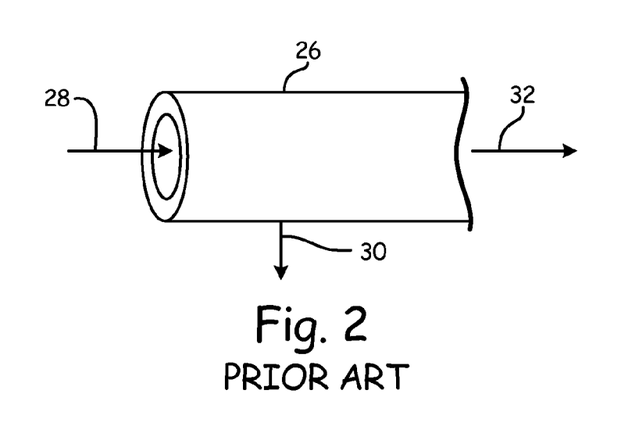
FIG. 2 is a partial perspective view of a fiber of a prior art air separation module.

FIG. 2 is a partial perspective view of fiber 26 of prior art air separation module 10. As feed gas 28 is fed into and drawn through fiber 26, permeate gas 30 permeates through the exterior of fiber 26. After permeate gas 30 is removed from fiber 26, reject gas 32 is removed from fiber 26. As provided above, fiber 26 is configured such that permeate gas 30 consists primarily of oxygen, and the resulting reject gas 32 is oxygen-depleted and/or nitrogen enriched.

Figure 3:
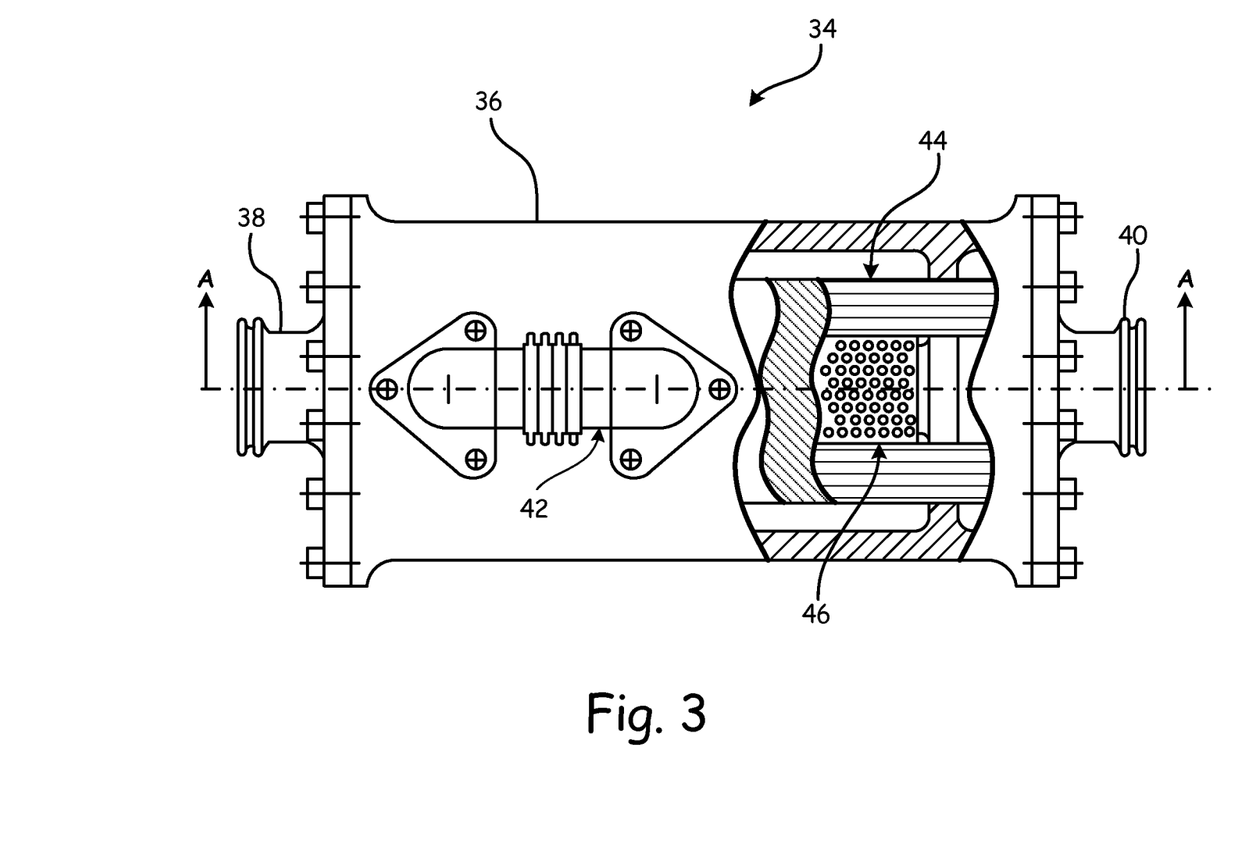
FIG. 3 is a partial cut-away elevation view of an air separation module.

FIG. 3 is a partial cut-away elevation view of air separation module 34. Air separation module 34 includes casing 36, casing inlet 38, casing outlet 40, permeate gas duct 42, fibers 44, and perforated canister 46. Fibers 44 are enclosed within casing 36. Casing inlet 38 is located at an upstream end of casing 36 and is in fluid communication with an upstream end of fibers 44. Casing outlet 40 is located at a downstream end of casing 36 and is in fluid communication with a downstream end of fibers 44. A portion of permeate gas duct 42 is located on the exterior of casing 36. Perforated canister 46 is located in-between fibers 44. Perforated canister 46 is cylindrical in shape and is positioned co-axially with casing 36.

Fibers 44 may consist of different materials based upon the desired permeance parameters of the gas and of fibers 44. Some examples of materials that can be used for fibers 44 include polysulfone, polyimide, and polyphenylene-oxide. For example, the membrane of fibers 44 is configured to substantially minimize nitrogen loss across the membrane. The thickness and diameter of fibers 44 may also be selected depending on the types of permeance parameters desired. For example, the diameter of fibers 44 can range from 50 micrometers to 400 micrometers.

Casing 36, casing inlet 38, casing outlet 40, permeate gas duct 42, and perforated canister 46 can be made of a metallic material such as aluminum, or another solid metallic material.

With the addition of perforated canister 46 to air separation module 34, a lesser number of fibers 44 is required to achieve the same effective permeate surface area as an air separation module without perforated canister 46, such as in prior art air separation module 10 shown in FIGS. 1-2. The reduction in the number of fibers 44 in air separation module 34 allows for a reduction in both the weight and cost of air separation module 34. The weight and cost reduction provides a benefit particularly applicable to the aircraft industry given the effect of weight reduction on the overall fuel consumption of the aircraft and the importance of keeping manufacturing costs low.

Additionally, the perforation pattern of perforated canister 46 can be varied to achieve desirable permeation rates of air separation module 34. Examples of variations in the perforation pattern include decreasing or increasing the number or sizes of perforations on the surface of perforated canister 46. The shape of the perforations of perforated canister 46 may also include a variety of shapes to achieve a desirable permeation rate. Examples of perforation shapes can include circles (as shown in FIG. 3), stars, slits, slots, rectangles, hexagons, and other regular or irregular shapes. Variations in the shapes and/or sizes of the perforations can increase or decrease the volume of permeate gas removed by perforated canister 46 with respect to the number of fibers 44 and/or the volume in air separation module 34.

Figure 4A:
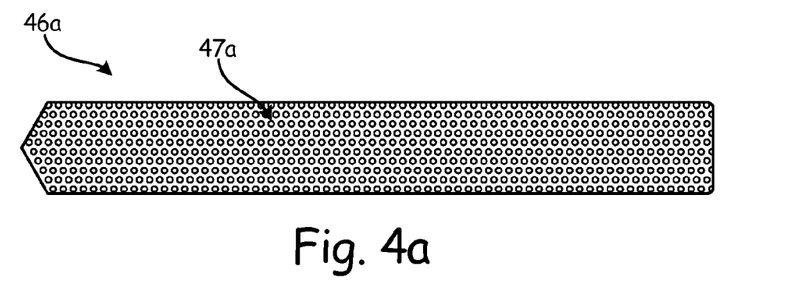
FIG. 4a is a side elevation view of a perforated canister.

FIG. 4a is a side elevation view of perforated canister 46a. Perforated canister 46a includes perforations 47a. Perforations 47a include a circular shape. The perforation pattern of perforations 47a includes a uniform distribution of perforations 47a, but the perforation pattern of perforations 47a could also include a non-uniform distribution as well.

Figure 4B:
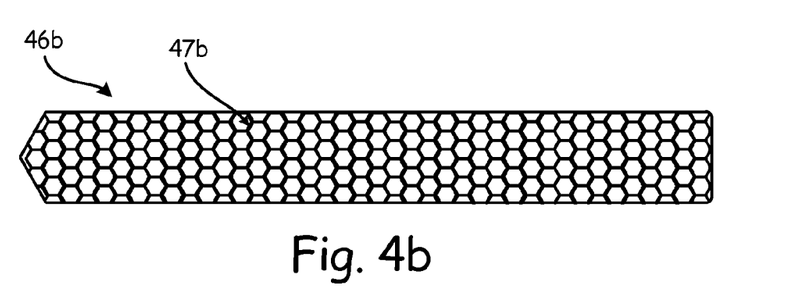
FIG. 4b is a side elevation view of a perforated canister.

FIG. 4b is a side elevation view of perforated canister 46b. Perforated canister 46b includes perforations 47b. Perforations 47b include a hexagonal shape. The perforation pattern of perforations 47b includes a uniform distribution of perforations 47b, but the perforation pattern of perforations 47b could also include a non-uniform distribution as well.

Figure 4C:
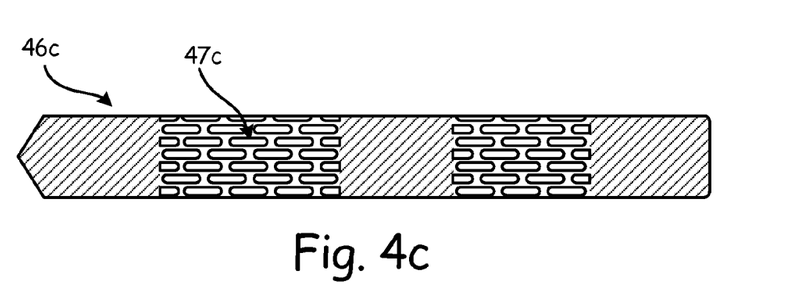
FIG. 4c is a side elevation view of a perforated canister.

FIG. 4c is a side elevation view of perforated canister 46c. Perforated canister 46c includes perforations 47c. Perforations 47c include a slot shape. The perforation pattern of perforations 47c includes a non-uniform distribution of perforations 47c which allows for selective control over the amount of gas permeated through perforated canister 46c. The non-uniform perforation pattern of perforated canister 46c allows less gas to permeate out of perforated canister 46c, as compared to if perforations 47c extended along the entire length of perforated canister 46c in a uniform manner.

Figure 5:
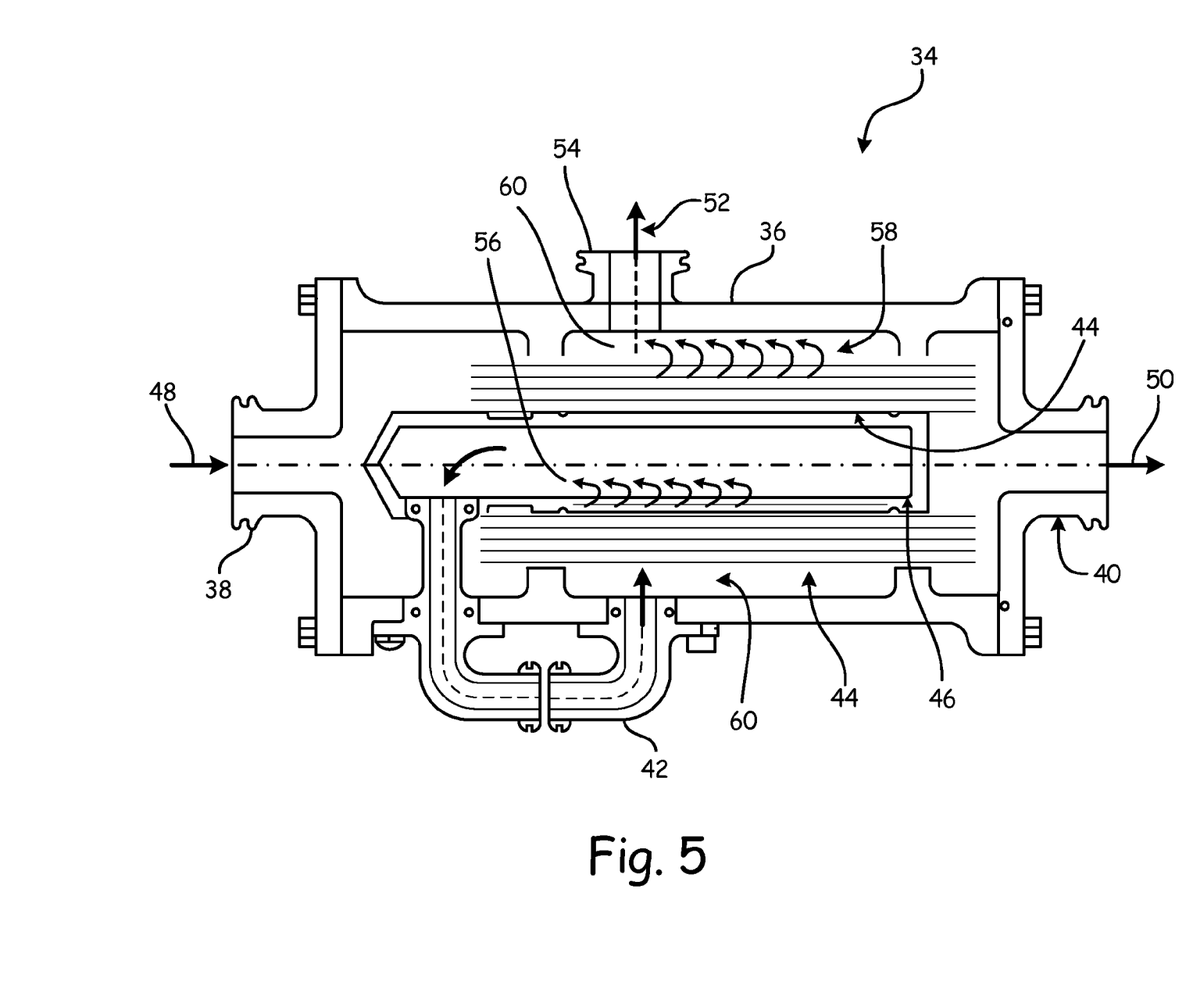
FIG. 5 is a side sectional view of an air separation module taken along A-A.

FIG. 5 is a side sectional view of air separation module 34 taken along A-A. Air separation module 34 includes casing 36, casing inlet 38 for reception of feed gas 48, casing outlet 40 for transfer of reject gas 50, permeate gas duct 42 for transportation of internal permeate gas 56, fibers 44, perforated canister 46 for reception of internal permeate gas 56, permeate gas outlet 54 for transfer of total permeate gas 52, and external permeate gas chamber 60 for transportation of external permeate gas 58.

Feed gas 48 is fed through casing inlet 38 and into fibers 44. Feed gas 48 may include bleed air from the aircraft engine. Once feed gas 48 is fed into fibers 44, feed gas 48 is forced down the length of fibers 44 from an upstream end of fibers 44 to a downstream end of fibers 44. As feed gas 48 is forced down the length of fibers 44, internal permeate gas 56 is permeated into perforated canister 46 and external permeate gas 58 is permeated through an exterior of the group of fibers 44 into external permeate gas chamber 60. The permeation of internal permeate gas 56 and external permeate gas 58 occurs due to a partial pressure differential across the membrane of fibers 44. The partial pressure differential across the membrane of fibers 44 is created by increasing the pressure within fibers 44 and reducing the pressure of oxygen outside of fibers 44. This partial pressure differential acts as the driving force to increase the amount of oxygen drawn through the membrane of fibers 44.

Perforated canister 46 and external permeate gas chamber 60 communicate fluidly through permeate gas duct 42. Internal permeate gas 56 travels through permeate gas duct 42 into external permeate chamber 60 where internal permeate gas 56 combines with external permeate gas 58 to form total permeate gas 52. Total permeate gas 52 is then expelled from casing 36 through permeate gas outlet 54. In this example, total permeate gas 52 consists of oxygen-rich permeated gas. The resulting reject gas 50 is then removed from casing 36 through casing outlet 40. In this example, reject gas 50 consists of a nitrogen-rich gas. As identified above, the nitrogen enriched reject gas 50 can be introduced into an aircraft fuel tank to reduce an oxygen concentration below a level necessary for combustion.

The addition of perforated canister 46 in-between fibers 44 has the effect of reducing the resistance to the permeate flow from fibers 44. Without perforated canister 46, the effective partial pressure difference is reduced due to mass-transfer limitations as a permeate gas 56 is channeled from fibers 44 to permeate gas outlet 54. By adding perforated canister 46 to the inside of fibers 44, the difficulty of removing total permeate gas 52 of fibers 44 is greatly decreased. With the addition of perforated canister 46, permeated air can now be drawn from an interior of fibers 44 much more efficiently.

Additionally, more than one perforated canister 46 can be inserted between fibers 44. For example, multiple tube-shaped canisters can be placed between multiple rings of fibers 44 so as to increase the effective permeate surface area of fibers 44.

Figure 6:
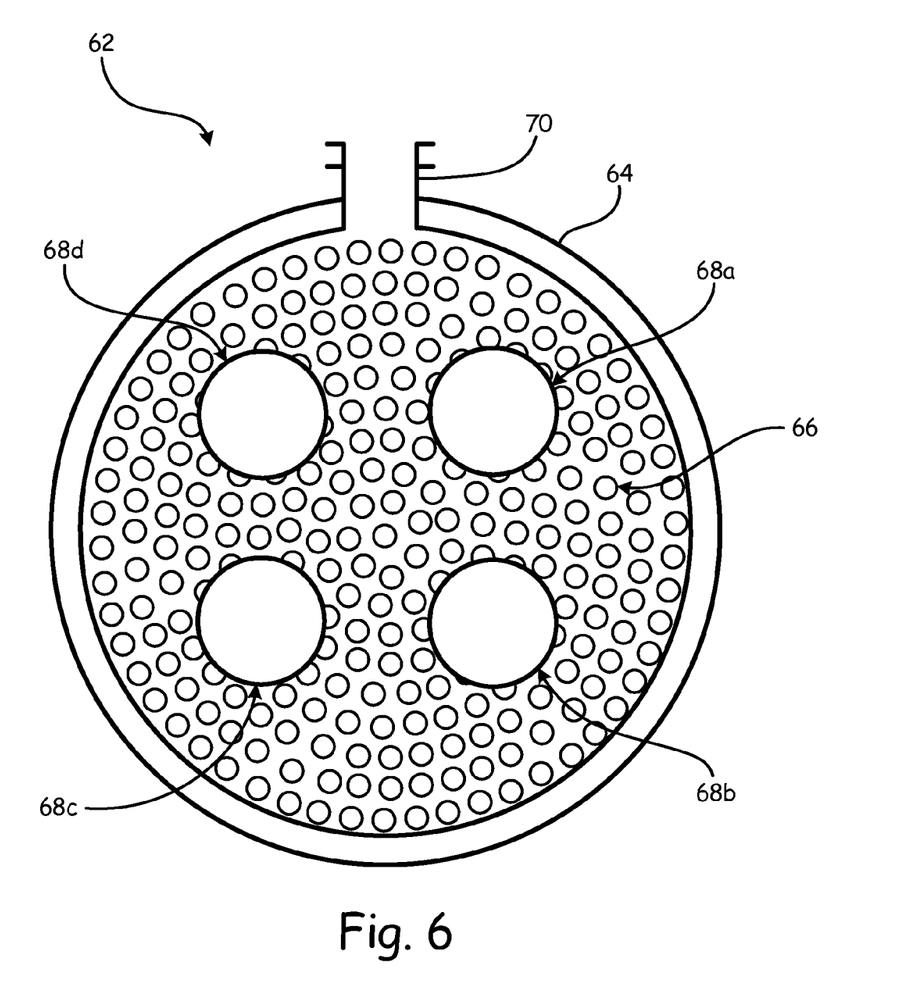
FIG. 6 is a cross-sectional view of an air separation module.

FIG. 6 is a cross-sectional view of air separation module 62 according to an alternate embodiment of the disclosure. Casing 64 contains fibers 66. Perforated canisters 68a, 68b, 68c, and 68d are disposed amongst fibers 66. Permeate gas outlet 70 provides an outlet for oxygen-rich gas permeated from fibers 66.

Air separation module 62 provides an example of an air separation module with perforated canisters 68a, 68b, 68c, and 68d. The number of perforated canisters 68a, 68b, 68c, and 68d used in air separation module 62 includes four, but a lesser or greater number of perforated canisters can be used. Additionally, in this example perforated canisters 68a, 68b, 68c, and 68d contain a circular cross-sectional shape. However, perforated canisters 68a, 68b, 68c, and 68d may contain other shapes to maximize the amount of effective permeate surface area of perforated canisters 68a, 68b, 68c, and 68d to maximize an amount of collected permeated gas with respect to the number of fibers 66 and/or the volume in air separation module 62.

Figure 7:
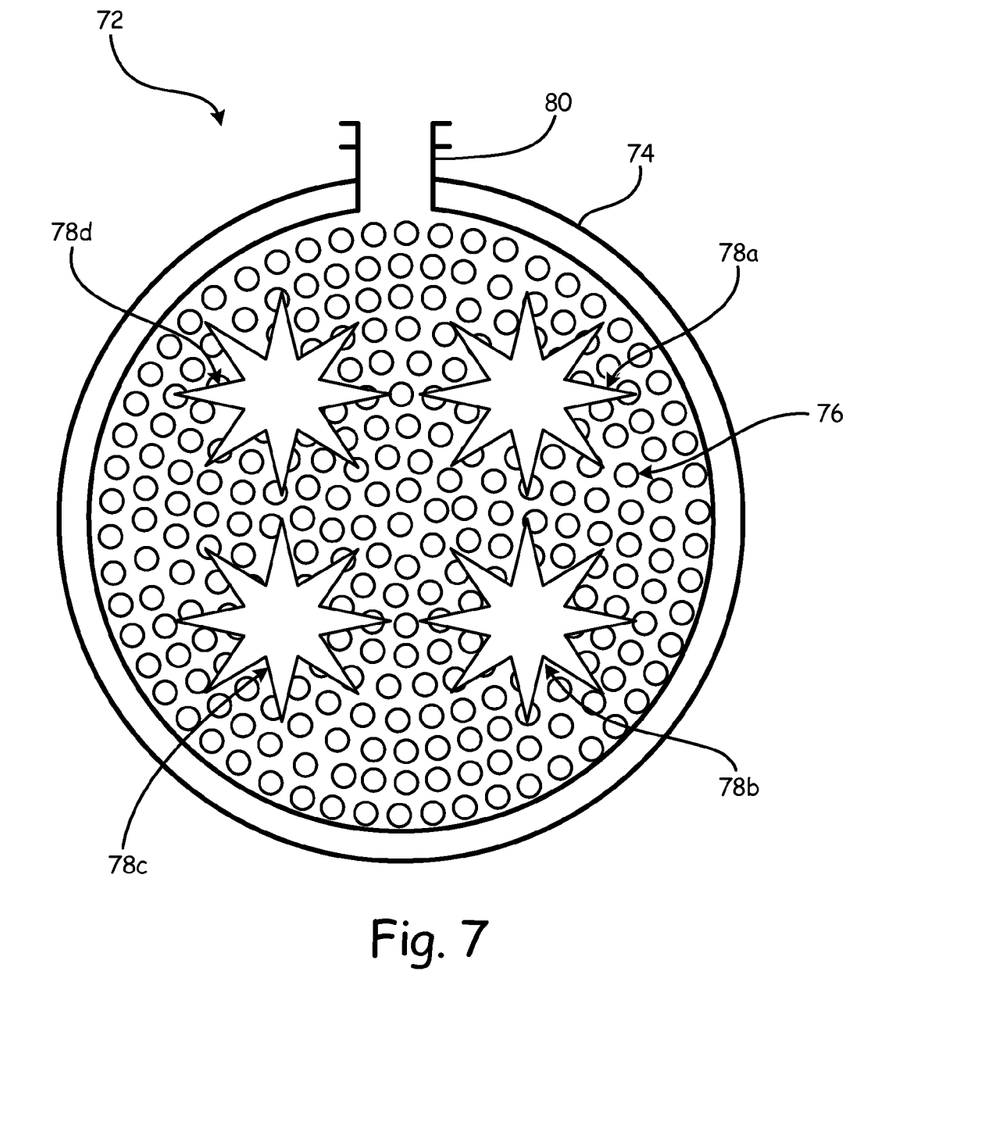
FIG. 7 is a cross-sectional view of an air separation module.

FIG. 7 is a cross-sectional view of air separation module 72 according to an alternate embodiment of the disclosure. Casing 74 contains fibers 76. Perforated canisters 78a, 78b, 78c, and 78d are disposed amongst fibers 76. Permeate gas outlet 80 provides an outlet for oxygen-rich gas permeated from fibers 76.

Air separation module 72 provides an example of an air separation module with perforated canisters 78a, 78b, 78c, and 78d which include a non-circular cross-sectional shape. In this embodiment, perforated canisters 78a, 78b, 78c, and 78d include a star-shaped cross section. The star-shaped cross section of perforated canisters 78a, 78b, 78c, and 78d provides an increased surface area as compared to a circular cross-sectional shape thereby increasing the amount of effective permeate surface area of perforated canisters 78a, 78b, 78c, and 78d. The increase in surface area of perforated canisters 78a, 78b, 78c, and 78d increases the volume of gas permeated through perforated canisters 78a, 78b, 78c, and 78d, therefore maximizing the amount of collected permeated gas with respect to the number of fibers 76 and/or the volume in air separation module 72.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present invention.

An air separation module according to an exemplary embodiment of this disclosure, among other possible things includes a plurality of fibers located within a casing. A fiber membrane may define an exterior of each of the plurality of fibers. The fiber membrane may form an interior passage along a length of each of the plurality of fibers. The fiber membrane may be configured to permeate a gas through the fiber membrane. At least one perforated canister may be placed between the plurality of fibers. The at least one perforated canister may be configured to collect a permeated gas from the plurality of fibers.

The air separation module of the preceding paragraph can optionally include, additionally and/or alternatively, any one or more of the following features, configurations and/or additional components:

a further embodiment of the foregoing air separation module, wherein the at least one perforated canister may include a cross-sectional profile configured to maximize a surface area of the at least one perforated canister with respect to a number of the plurality of fibers in the air separation module;

a further embodiment of the foregoing air separation module, wherein the at least one perforated canister may include a plurality of perforated canisters;

a further embodiment of the foregoing air separation module, wherein each of the plurality of perforated canisters may be configured to maximize a surface area of the plurality of perforated canisters with respect to a volume in the air separation module;

a further embodiment of the foregoing air separation module, wherein each of the plurality of fibers may be configured to expel a nitrogen-enriched gas from an outlet end of each of the plurality of fibers;

a further embodiment of the foregoing air separation module, wherein the perforated canister may include perforations, the perforations may be configured to maximize an amount of collected permeated gas with respect to the number of the plurality of fibers in the air separation module;

a further embodiment of the foregoing air separation module, wherein the casing may include a casing inlet and a casing outlet; and/or a further embodiment of the foregoing air separation module, wherein the air separation module may be positioned within an aircraft comprising a turbine engine and a compressor with a bleed system connected to the casing inlet.

A method for removing oxygen from engine bleed air according to an exemplary embodiment of this disclosure, among other possible things includes feeding a fluid into an air separation module. The air separation module may include a plurality of fibers located within a casing. A fiber membrane may define an exterior of each of the plurality of fibers. At least one perforated canister may be placed between the plurality of fibers. The fluid may be forced down the length of the plurality of fibers. A first portion of the fluid may be permeated through the fiber membrane to create a permeated fluid. A portion of the permeated fluid may be collected into the at least one perforated canister. The permeated fluid may be expelled from the casing. Any non-permeated fluid may be removed from the casing through an outlet that may be located on an end of the casing.

The method for removing oxygen from engine bleed air of the preceding paragraph can optionally include, additionally and/or alternatively, any one or more of the following features, configurations and/or additional components:

a further embodiment of the foregoing method for removing oxygen from engine bleed air, wherein the permeated fluid may comprise an oxygen-rich permeated gas;

a further embodiment of the foregoing method for removing oxygen from engine bleed air, wherein the at least one perforated canister may include a cross-sectional profile that may be configured to maximize a surface area of the at least one perforated canister with respect to a number of the plurality of fibers in the air separation module;

a further embodiment of the foregoing method for removing oxygen from engine bleed air, wherein the perforated canister may include perforations, the perforations may be configured to maximize an amount of collected permeated gas with respect to the number of the plurality of fibers in the air separation module;

a further embodiment of the foregoing method for removing oxygen from engine bleed air, wherein the fluid may be bleed air from a compressor; and/or a further embodiment of the foregoing method for removing oxygen from engine bleed air, wherein the fluid may be compressed RAM air; and/or a further embodiment of the foregoing method for removing oxygen from engine bleed air, wherein the at least one perforated canister may include a plurality of perforated canisters that may contain cross-sectional profiles configured to maximize a surface area of the plurality of perforated canisters with respect to a volume in the air separation module.

The invention claimed is:

1. An air separation module comprising:
    a casing;
    a plurality of fibers located within the casing;
    a fiber membrane defining an exterior of each of the plurality of fibers, thereby forming an interior passage along a length of each of the plurality of fibers, the fiber membrane being configured to permeate a gas through the fiber membrane; and
    at least one perforated canister is placed between the plurality of fibers, wherein the at least one perforated canister is configured to collect a permeated gas from the plurality of fibers; further wherein the at least one perforated canister includes a cross-sectional profile configured to maximize a surface area of the at least one perforated canister with respect to a number of the plurality of fibers in the air separation module.

2. The air separation module of claim 1, wherein the at least one perforated canister includes a plurality of perforated canisters.

3. The air separation module of claim 2, wherein each of the plurality of perforated canisters is configured to maximize a surface area of the plurality of perforated canisters with respect to a volume in the air separation module.

4. The air separation module of claim 1, wherein each of the plurality of fibers is configured to expel a nitrogen-enriched gas from an outlet end of each of the plurality of fibers.

5. The air separation module of claim 1, wherein the perforated canister includes perforations, the perforations configured to maximize an amount of collected permeated gas with respect to the number of the plurality of fibers in the air separation module.

6. The air separation module of claim 1, wherein the casing includes a casing inlet and a casing outlet.

7. The air separation module of claim 6, wherein the air separation module is positioned within an aircraft comprising:
    a turbine engine; and
    a compressor with a bleed system connected to the casing inlet.

8. A method for removing oxygen from engine bleed air, the method comprising:
    feeding fluid into an air separation module, wherein the air separation module comprises:
        a casing;
        a plurality of fibers located within the casing;
        a fiber membrane defining an exterior of each of the plurality of fibers, thereby forming an interior passage along a length of each of the plurality of fibers, the fiber membrane being configured to permeate a gas through the fiber membrane; and
        at least one perforated canister is inserted between the plurality of fibers, wherein the at least one perforated canister is configured to collect a permeated gas from the plurality of fibers; further wherein the at least one perforated canister includes a cross-sectional profile configured to maximize a surface area of the at least one perforated canister with respect to a number of the plurality of fibers in the air separation module;
    forcing the fluid down the length of the plurality of fibers;
    permeating a first portion of the fluid through the fiber membrane to create a permeated fluid;
    collecting a portion of the permeated fluid into the at least one perforated canister;
    expelling the permeated fluid from the casing; and
    removing any non-permeated fluid from the casing through an outlet located on an end of the casing.

9. The method of claim 8, wherein the perforated canister includes perforations, the perforations configured to maximize an amount of collected permeated gas with respect to the number of the plurality of fibers in the air separation module.

10. The method of claim 9, further comprising:
    introducing the nitrogen-enriched gas into a fuel tank to reduce an oxygen concentration below a level necessary for combustion.

11. The method of claim 8, wherein the fluid is bleed air from a compressor.

12. The method of claim 11, wherein the fluid is compressed RAM air.

13. The method of claim 8, wherein the at least one perforated canister includes a plurality of perforated canisters that contain cross-sectional profiles configured to maximize a surface area of the plurality of perforated canisters with respect to a volume in the air separation module.

* * * * *